A. CALLESON.
BOTTLE SEALING MACHINE.
APPLICATION FILED AUG. 13, 1919.

1,377,395.

Patented May 10, 1921.
7 SHEETS—SHEET 1.

WITNESS
Wm. D. Bell

INVENTOR,
Amos Calleson,
BY
John Steward,
ATTORNEY.

A. CALLESON.
BOTTLE SEALING MACHINE.
APPLICATION FILED AUG. 13, 1919.

1,377,395.

Patented May 10, 1921.
7 SHEETS—SHEET 4.

WITNESS
Wm. Bell.

INVENTOR,
Amos Calleson,
BY
ATTORNEY

A. CALLESON.
BOTTLE SEALING MACHINE.
APPLICATION FILED AUG. 13, 1919.

1,377,395.

Patented May 10, 1921
7 SHEETS—SHEET 6.

WITNESS
Wm. Bell

INVENTOR
Amos Calleson
BY John Steward
ATTORNEY

A. CALLESON.
BOTTLE SEALING MACHINE.
APPLICATION FILED AUG. 13, 1919.

1,377,395.

Patented May 10, 1921.
7 SHEETS—SHEET 7.

WITNESS
Wm. D. Bell

INVENTOR
Amos Calleson,
BY
ATTORNEY.

UNITED STATES PATENT OFFICE.

AMOS CALLESON, OF BROOKLYN, NEW YORK, ASSIGNOR TO ADRIANCE MACHINE WORKS, INC., OF BROOKLYN, NEW YORK, A CORPORATION OF NEW YORK.

BOTTLE-SEALING MACHINE.

1,377,395.     Specification of Letters Patent.     Patented May 10, 1921.

Application filed August 13, 1919. Serial No. 317,192.

*To all whom it may concern:*

Be it known that I, AMOS CALLESON, a citizen of the United States, residing at Brooklyn, in the county of Kings and State of New York, have invented certain new and useful Improvements in Bottle-Sealing Machines, of which the following is a specification.

This invention relates to bottle sealing and the like machines, and it consists in certain improvements in machines of this class, perhaps best typified in Letters Patent No. 1,096,527 heretofore granted on an application filed by me, designed to increase the general efficiency of certain mechanisms, notably the means for sealing or applying closures to the bottles or other containers and the means for advancing the containers.

In the drawings,

Figure 1 is a front elevation of the machine;

Fig. 10 is a front elevation and Fig. 11 a top plan of the block $p$ which imparts lateral movement to said plate;

Fig. 12 is a side elevation of said block;

Fig. 13 is a plan of a certain structure $z$ which is adjustable vertically in the aforesaid part $f$ of the carrier;

Fig. 14 is a sectional view on the line 14—14, Fig. 13, the bracket 7 appearing in elevation;

Fig. 15 is a side elevation of the bracket 7 shown in Figs. 13 and 14;

Fig. 16 is a detail illustrating the means for ejecting improperly faced closures;

Fig. 17 is an elevation of the part 28 shown in Fig. 16;

Fig. 18 is a side elevation of the closure delivery chute and adjoining mechanism;

Fig. 18[a] shows the closure check in plan;

Figure 3:
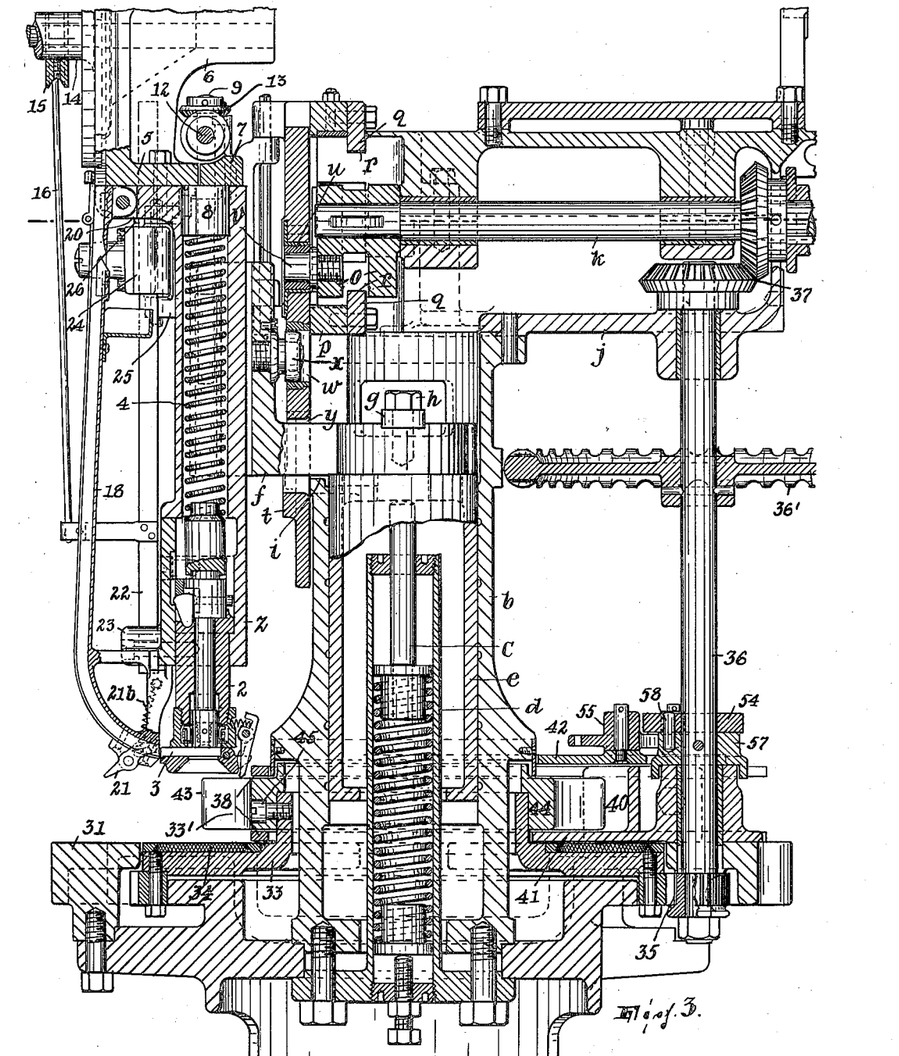
Fig. 3 is a vertical sectional view of the table and superstructure in a front-to-rear central plane.
Figure 4:
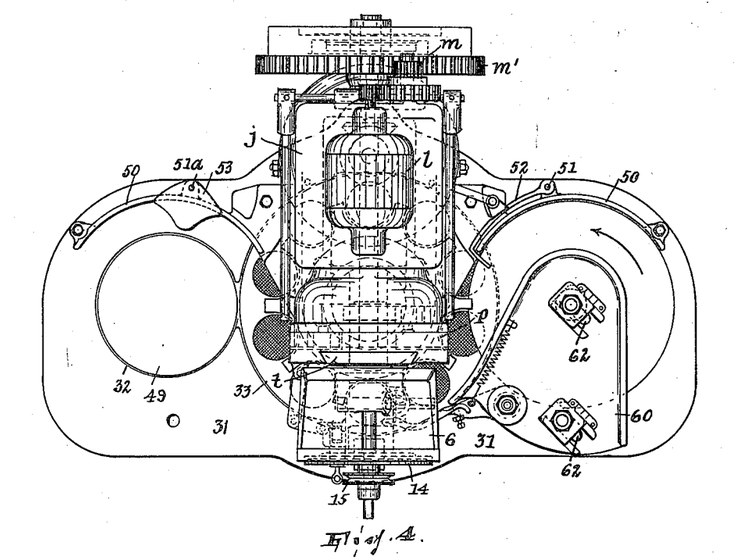
Fig. 4 is a plan.
Figure 5:
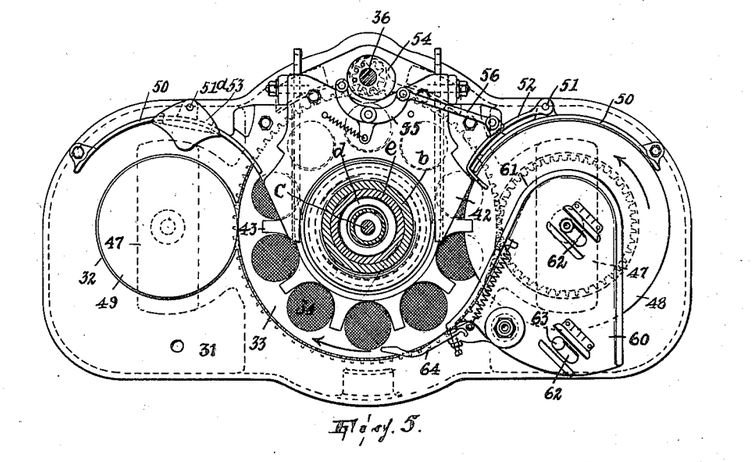
Fig. 5 is a horizontal sectional view in a plane just above the bottle feeding instrumentalities.
Figure 6:
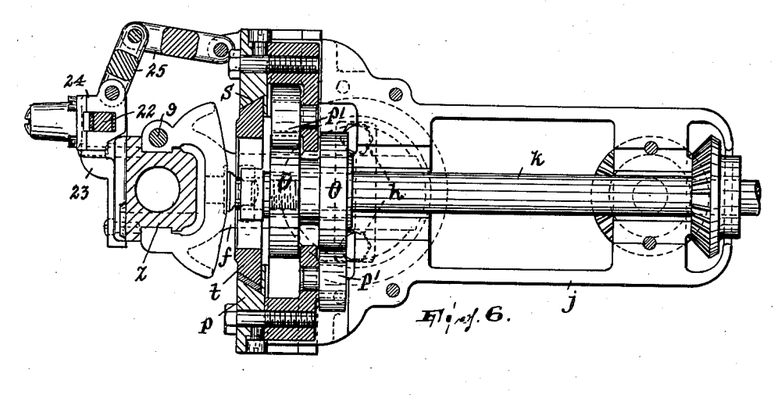
Fig. 6 is a sectional view on the line 6—6, Fig. 2.
Figures 7, 8:
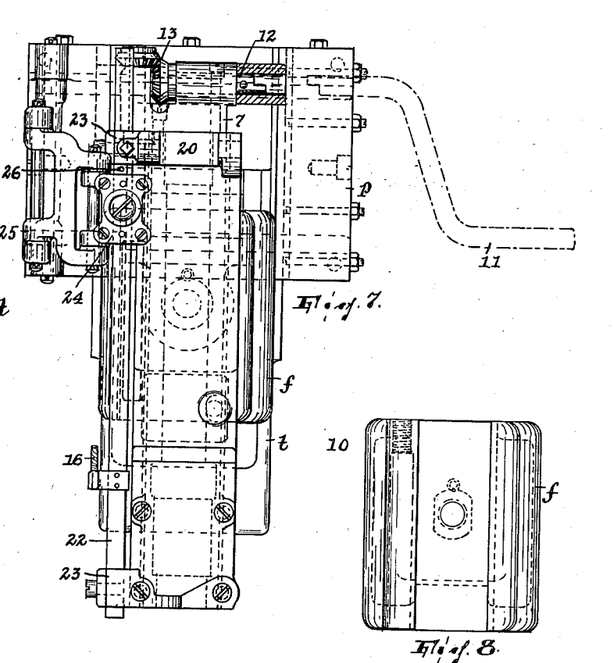
Fig. 7 is a front elevation of the main moving parts at the front of the superstructure, the closure hopper being removed.
Fig. 8 is a front elevation of the part $f$ of a certain carrier.
Figure 9:
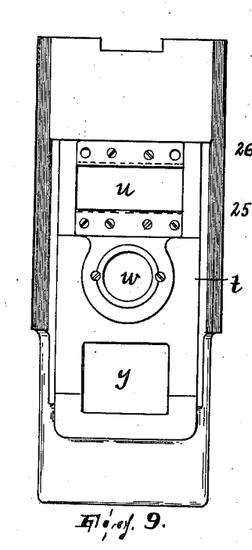
Fig. 9 is a front elevation of the plate $t$.
Figures 10, 11, 12, 13, 14, 15, 16, 17:
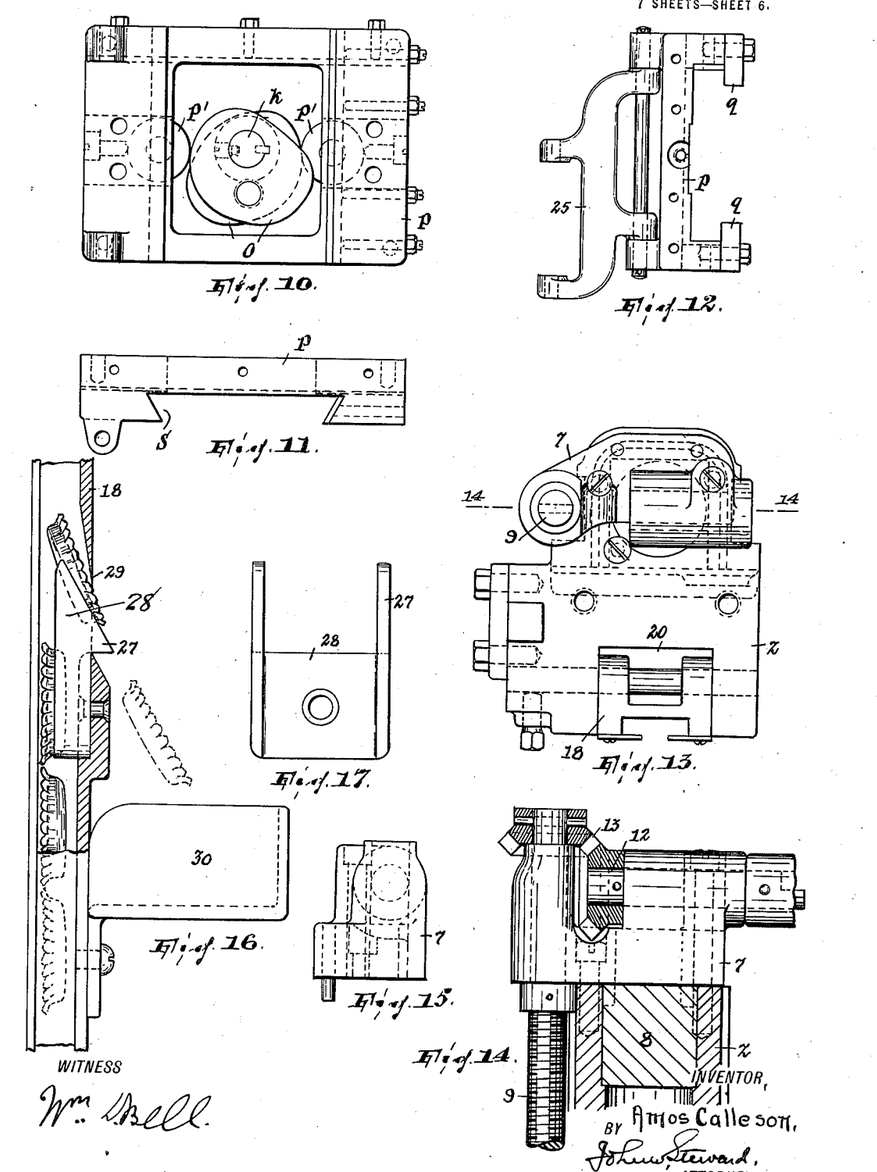

The basal portion $a$ of the machine has upstanding therefrom, bolted thereto, the pillar $b$ which contains a suitable downwardly yielding spring-supported plunger $c$ housed in the fixed tubular guide $d$. This plunger supports a carrier formed of two parts $e$ and $f$; part $e$ is cylindrical and fits and is adapted to oscillate and move up and down in the pillar, and part $f$ is an arm (see Figs. 3, 6 and 8) which is seated in a transverse slot in the top of part $e$, being removably secured therein by a cross-piece $g$ notched into parts $e$ and $f$ and secured to part $e$ by screws $h$, and which projects forward through an opening $i$ in the pillar of a size to permit the arm to move as seen in front elevation in an endless path. The carrier, by part $f$, supports the mechanism for supplying and affixing the closures and in order to impart to the carrier the motions which resolve themselves into the aforesaid motion of arm $f$ in an endless path, viz., up and down motions of the carrier alternating with oscillatory movements thereof on the axis of the pillar, I provide the following mechanism:

In a casing $j$ at the top of the pillar is journaled the main shaft $k$ (suitably driven, but herein actually shown as driven by a motor $l$ through gearing $m$ $m'$ the latter member of which is free on the shaft but adapted to be made fast therewith by the hand-operated clutch $n$) which at its forward end has cams $o$ whereby to reciprocate horizontally a block $p$ apertured to admit the forward portion of the shaft and equipped with rollers $p'$ which bear against the respective cams and with gibs $q$ engaged in guiding slots $r$ formed in the top and bottom of the forward portion of casing $j$ (see Figs. 3 and 10 to 12). In the block $p$, which has a dove-tailed groove $s$ at the front, slides vertically the plate $t$ which has a slot $u$ to receive a wrist-pin $v$ on said shaft. In consequence of the foregoing, rotation of shaft $k$ will obviously cause the plate to move in an endless path in a vertical plane. The motion of the plate is transmitted to the carrier (so that viewed from the front each follows an endless path, though the plate moves in a vertical plane and the carrier oscillates on a vertical axis) by a universal coupling afforded by a stud on the arm part $f$ of the carrier received in a hole $w$ in the plate and preferably equipped with a ball or crowned-periphery roller $x$ to eliminate friction and binding. Arm $f$ oscillates in a suitable aperture $y$ in the plate $t$. The spring upheld plunger $c$ is not indispensable, but it greatly aids in easing the action of the parts and insures smoother running.

Arm $f$ of the aforesaid carrier is formed to afford guideways for a vertically adjustable structure $z$, which is a vertically elongated casting (Figs. 3 and 6) containing a sealing-head-including means 2 having an aperture 3 for the reception of the closures to be affixed and which requires no further description herein (see my Patent No. 1078607) excepting to say that to allow compensation for varying bottle heights said means is yieldable upwardly, being normally held down by the spring 4 contained in structure $z$. Bolted to the top of the structure $z$ and covering its bore are the foot portion 5 of the closure supply hopper 6 and a bracket 7, these forming an abutment for the plug 8 against which spring 4 upwardly bears. An adjusting screw 9 is swiveled in bracket 7 (Figs. 13 to 15) at its upper end and tapped at 10 (Fig. 8) into the arm $f$, and by applying a crank, as 11 (Fig. 7), to a shaft 12 which is journaled in the bracket 7 and connected with the screw by bevel gearing 13 structure $z$ may be adjusted vertically to adapt the machine to bottles of different height-standards.

Figures 1, 18, 18A:
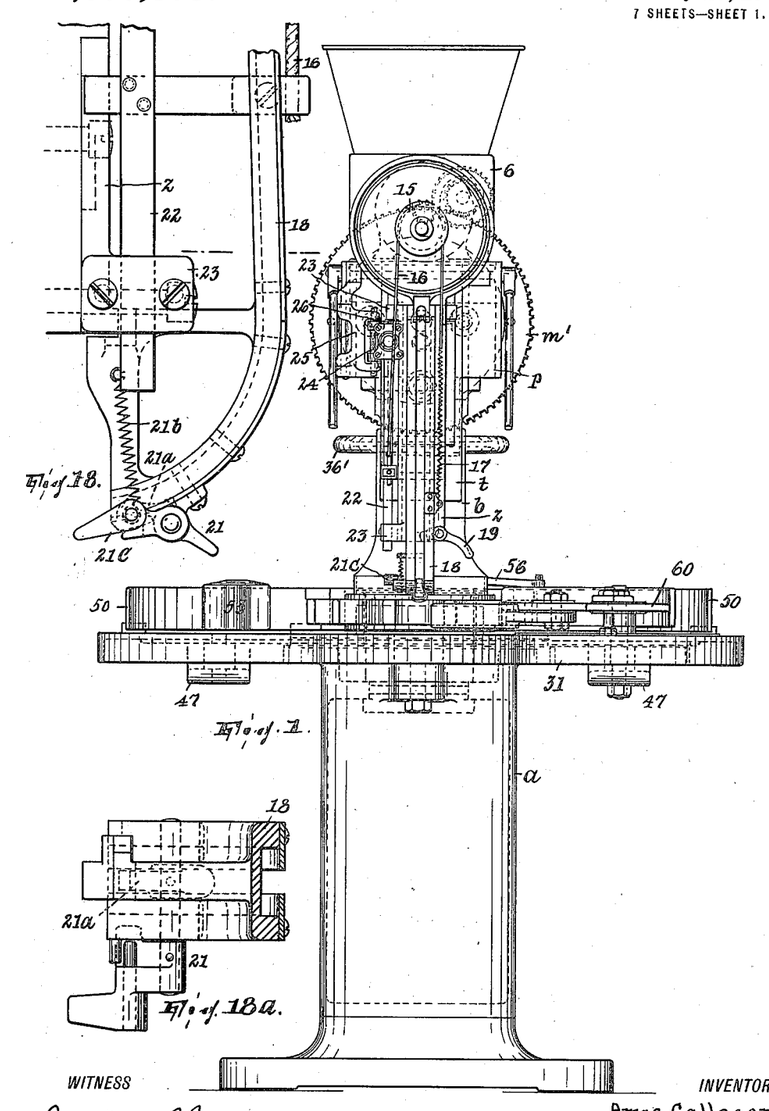
Figure 2:
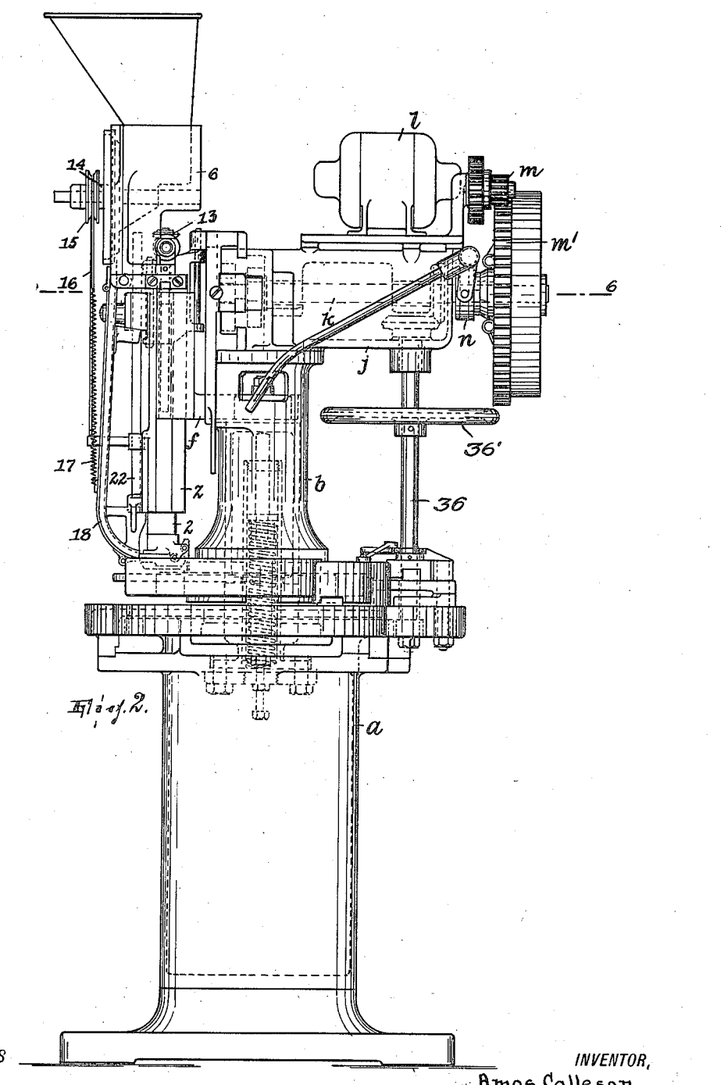
Fig. 2 is a side elevation.

The closure-supply hopper may be constructed in any way (as in my Patent No. 1096527) so as to deliver the closures to the closure chute so that they will be fed into the aperture 3 of the sealing head open side down; but it preferably includes a rotary closure agitator 14 equipped with a pulley 15 around which extends a thong 16 or equivalent flexible attenuated device which is attached at one end, through the medium of a spring 17, to structure $z$ (Fig. 1) and at the other end is connected to a part of the machine with reference to which structure $z$ normally reciprocates vertically, as will be explained, in consequence of which the agitator will be rotated back and forth in an obvious manner. The closure chute 18 is pivoted at its upper end (so that it may be swung outwardly clear of the sealing head to permit access thereto, though it is normally held locked by the detent 19 shown in Fig. 1 in position to deliver to the sealing head) in a recess 20 in the forwardly projecting top portion of structure $z$ (Figs. 3 and 13), and at its lower end it is equipped with a closure check 21 having an arm $21^a$ which is normally held, by a spring $21^b$, in position to check delivery of the closures from the chute, and also having a thumb piece $21^c$. Usually there is a line of closures in the chute supported by the closure check, and when, after a downward or sealing movement, structure $z$ ascends the closure check is moved to release the closure line and allow the lowest closure to enter aperture 3 in the sealing head. This movement is caused by the same element, in the present case, to which the left hand end of thong 16 is connected in Fig. 1, viz: the vertical rod 22, which may slide in upper and lower guides 23 on structure $z$ and is held near its upper end by a grip-device 24 which maintains a friction grip thereon (substantially as in my Patent 1096527) so that normally the rod is held against vertical movement although it will yield in the grip-device under sufficient pressure. Vertical movement of the grip-device is prevented by attaching it to some part of the machine having no such movement, for instance, the block $p$, the connection being the toggle 25 (Figs. 3, 6 and 12) or other coupling which will allow for the variations in lateral distance which the grip-device in oscillating with the structure $z$ will assume with respect to said part. The frictional character of the hold of the grip-device on the rod allows a compensating adjustment of the rod upon structure $z$ being adjustable vertically, accomplished by the lower end of the rod being impinged by the check-device 21 and so elevated in the grip-device on upward adjustment of said structure, and by a stud 26 (Figs. 1, 3 and 7) on the rod being impinged by the upper guide 23 and so depressing the rod in the grip-device on downward adjustment of said structure, substantially as in my last named patent.

Occasionally the rectifying means in the closure hopper may fail to work so that a closure will be delivered to the chute wrong side up. I therefore provide in the chute (Figs. 16 and 17) means to switch such a closure out of the line of closures preferably consisting of a pair of switch points 27 (herein shown as forming the side edges, upwardly prolonged, of a plate 28 which is secured against one of the broad walls of the chute) each having its upper or acting end in about the central plane of the chute and its inclined or switching face reaching through an opening 29 in one broad wall of the chute, each such switch point being spaced from the opposite chute wall a distance sufficient to permit the flared flange portion of a closure to pass between. The two switch points are spaced apart but slightly more than the diameter of the body part of the closure. If a closure is properly faced it will pass the switch and on down the chute in the regular way; if it is improperly faced it will be deflected by the switch out of the chute through opening 29 and into some suitable receiver as 30.

The basal part of the machine has a table 31 formed with circular openings 32 at right and left of pillar $b$. The bottles are automatically fed, either from right to left or vice versa, from one wing of this table past and under the sealing means onto the other wing, the feeding means being reversible, as well as the direction of movement of the sealing means, for this purpose, as will appear.

Figures 19, 20, 21, 22:
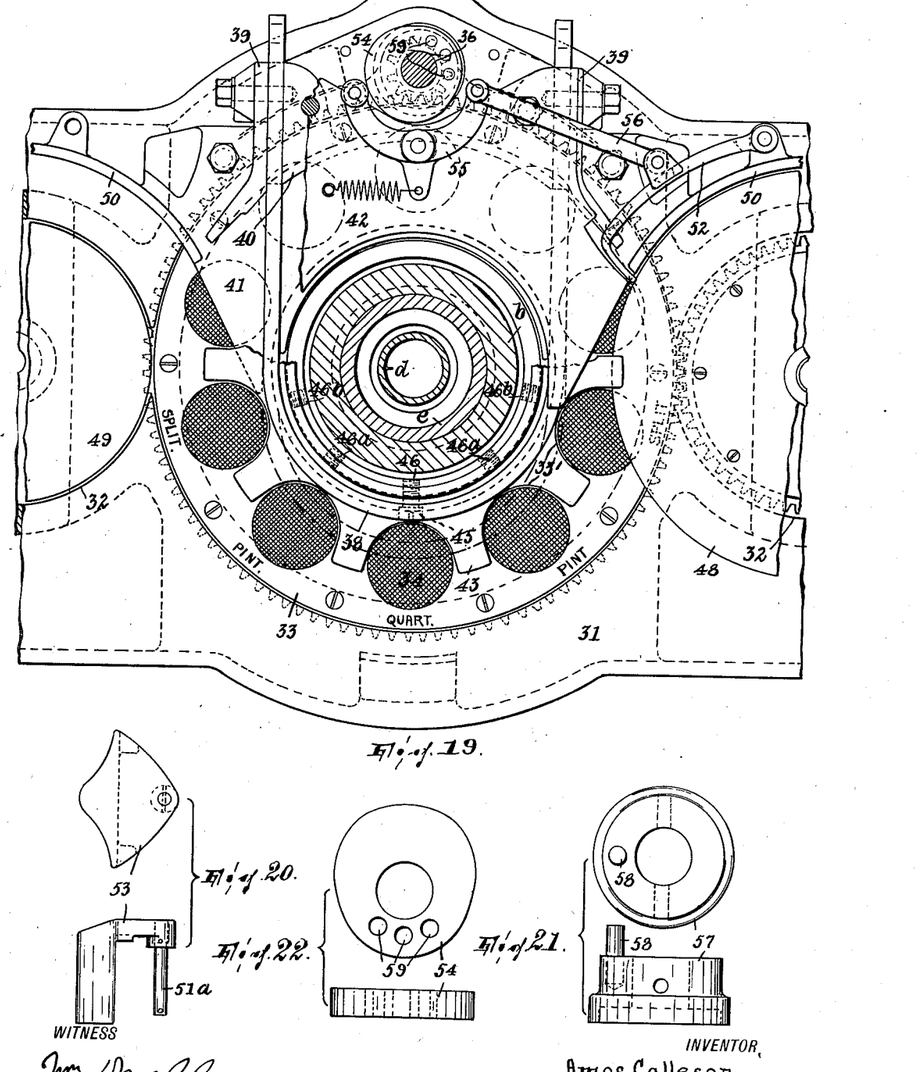
Fig. 19 is an enlarged fragmentary sectional view in substantially the same plane as Fig. 5.
Figs. 20, 21 and 22 show details of the means for controlling the feed of the bottles.

The bottle advancing turret 33 rotates concentrically with the pillar substantially as in my patent 1,096,527 and has radial bottle-pockets 33' coinciding with pads 34 for the bottles. It is moved continuously through gearing 35 from a shaft 36 journaled in the table and casing $j$ and connected by gearing 37 with shaft $k$, 36' being a hand-wheel on shaft 36 for manually "turning over" the machine. To adapt the machine to bottles varying in diameter (quarts, pints, splits) I employ a gage or guide whose acting portion is curved concentrically with the turret and adjustable diametrically thereof, preferably consisting of a pair of U-shaped members 38 straddling the turret and having their bowed or curved portions forward and their legs held by screw-held releasable clamps 39 which bind them against the side faces of an elevated part 40 (Figs. 3 and 19) of the lower one of two plates 41 42 which house the turret back of the pillar. By adjusting the gage forward or back the bottle heads can be made to register, radially of the axis of motion of the turret and sealing head, with the sealing head, whatever the diameter of the bottles. It is necessary also, of course, when effecting such an adjustment, to gage in the circumferential direction the position of the bottles according to their diameter. Hence the aforesaid bottle pockets 33' are the spaces between the radial projections 43 on a ring 44 embracing the turret and held thereto by a screw 45 which may enter any one of the five threaded holes 46, 46$^a$ and 46$^b$ in the turret, shown in Fig. 19; each of holes 46$^a$ is spaced to right and left of hole 46 slightly more than the center-to-center spacing of the pads 34, and each of holes 46$^b$ is spaced from the adjoining hole 46$^a$ still farther. According as the feed is right or left so the screw 45 is changed from the center hole 46 to one of the holes 46$^a$ 46$^b$ at one or the other side of the intermediate hole 46, so rotatably advancing the projections to positions more or less over the pads.

Crossing each hole 32 in the table, underneath, is a bridge-plate 47 apertured centrally. One of these supports a bottle advancing disk 48 having a centering spindle in its aperture and peripheral gear teeth meshing with the peripheral teeth 35 on the turret and whereby it is driven. The other supports a disk 49 which simply fills the corresponding hole 32. Back of each hole there is an arc-shaped bottle-guide 50 having holes in one of which is fitted a fulcrum pin 51 on a removable bottle-check 52 and in the other of which is removably fitted a pin 51$^a$ of a deflector-block 53, parts 52 and 53 being interchangeable. The bottle-check 52 is oscillated from a cam 54 on shaft 36 through a spring-pressed lever 55 and a link 56; the cam actually rests on a disk 57 pinned to the shaft and having a stud 58 to enter any of three holes 59 in the cam, which may thus be shifted around the shaft as an axis for timing the action of the bottle-check with respect to the position of rotative adjustment of turret ring 44 to suit different diameters of bottles. There is further a guide-plate 60 with an edge 61 curved parallel with the bottle-guide 50 and resting on the table over disk 48, the same having parallel slots 62 to receive the centering spindle of the latter and a stud 63 on the table enabling it to be adjusted rectilineally to vary the width of the guideway which it forms with the bottle-guide and the plates 41, 42; this plate has a spring-pressed arm 64 which forces the bottles to proper position at the moment of sealing.

Operation: The general operation of the machine will be apparent. The sealing head is kept moving continuously in a path which in plan is arc-shaped and concentric to the axis of pillar $b$ and in front elevation is endless, while the bottles are kept moving in a procession under the sealing head by the continuously rotated turret, the parts being so timed that on each descent of the sealing head it seals a bottle, for a time moving with it. The bottles are placed on the disk 48, are then carried around against the bottle-check 52, which allows them at proper intervals to move from the disk into the pockets of the turret, and finally leave the turret and crowd onto the table at the side of the pillar opposite where they started, the deflector block 53 crowding them forwardly, insuring the accumulation of a larger number than if they were allowed to follow the guide 50.

If it is desired to reverse the machine the direction of rotation of shaft $k$ is reversed and the parts 48, 60, 52, 56 on the one hand and 49 and 53 changed (inverted where necessary) from one wing of the table to the other.

Disk 48, due to the gearing, rotates faster than the turret and tends to crowd each bottle forward against a projection 43, 44—43 thus being a gaging member. The rendering of part 52 capable of being timed is desirable, in view of this, so that it will clear the bottle when, whatever the adjustment of gaging member 44—43 to suit different diameters of bottles, each projection 43 reaches a certain point in passing it.

Having thus fully described my invention, what I claim as new and desire to secure by Letters Patent is:—

1. In combination, with a frame and means, movable in a bent course, or exerting pressure on the containers, of means for moving said pressure-exerting means in said course including motion-transmitting members each movable in a plane and substantially rectilinearly, one in the frame and the other in, and across the path of, the first-named member and having said pressure-exerting means connected therewith, and means to move each of said members in its rectilinear path.

2. In combination, with a frame and means, movable in a bent course, for exerting pressure on the containers, of means for moving said pressure-exerting means in said course including motion-transmitting members each movable in a plane and substantially rectilinearly, one in the frame and the other in, and across the path of, the first-named member and having said pressure-exerting means connected therewith, and a rotary structure having means to move each of said members in its rectilinear path.

3. In combination, with a frame and means, movable pivotally and also longitudinally of its axis of pivotal motion, for exerting pressure on the containers, of means for moving said pressure-exerting means including a motion-transmitting member having said pressure-exerting means connected therewith and being movable in a bent course lying in a plane substantially parallel with said axis.

4. In combination, with a frame including a vertical hollow pillar, and means for exerting pressure on the containers including a carrier movable within and longitudinally of the pillar, of means exterior of and on the pillar for moving said means in one direction, whereby to exert the pressure, and a spring within the pillar and opposing movement of the carrier and hence of said means in said direction.

5. In combination, with a frame including a vertical hollow pillar, and means for exerting pressure on the containers including a carrier movable within the pillar in an arc around and also lengthwise of a substantially vertical axis, of means exterior of the pillar for moving said means in one direction longitudinally of said axis and also in an arc around the same, and a spring within the pillar opposing movement of the carrier and hence of said means in the other direction longitudinally of said axis.

6. In combination, with a frame including a vertical hollow pillar, and means for exerting pressure on the containers including a carrier movable within the pillar in an arc around and also lengthwise of the axis of the pillar, of means exterior of the pillar for moving said means in one direction longitudinally of said axis and also in an arc around the same, and a spring within the pillar opposing movement of the carrier and hence of said means in the other direction longitudinally of said axis.

7. In combination, with a frame and means to operate on containers arranged therein, means to convey the containers in a procession and in a horizontal curved path past the first means consisting of a container support rotative on a vertical axis, and a U-shaped container gage having its intermediate part forming a curved container gaging face approximately concentric with said path and its legs secured to said frame.

8. Means to feed containers in a substantially horizontal plane including a container support journaled on a vertical axis, a gaging member adjustable on the support around said axis and having radial container-gaging projections, means to move a procession of the containers onto the support one after another, a check movable back and forth into and out of the path of said procession of containers, a driving means, and separate motion transmitting connections between the driving means and said support and check, one of said connections being adjustable to alter the relative timing of the check and gaging member.

In testimony whereof I affix my signature.

AMOS CALLESON.